US008336001B2

(12) United States Patent
Chang et al.

(10) Patent No.: US 8,336,001 B2
(45) Date of Patent: Dec. 18, 2012

(54) METHOD FOR IMPROVING YIELD RATE USING REDUNDANT WIRE INSERTION

(75) Inventors: Fong-Yuan Chang, Chu-Dong Township, Hsinchu County (TW); Wai-Kei Mak, Hsinchu (TW); Ren-Song Tsay, Chu-Pei (TW)

(73) Assignee: Springsoft, Inc., Hsinchu (TW)

( * ) Notice: Subject to any disclaimer, the term of this patent is extended or adjusted under 35 U.S.C. 154(b) by 0 days.

(21) Appl. No.: 12/913,674

(22) Filed: Oct. 27, 2010

(65) Prior Publication Data

US 2011/0107278 A1    May 5, 2011

Related U.S. Application Data

(60) Provisional application No. 61/256,422, filed on Oct. 30, 2009.

(51) Int. Cl.
*G06F 17/50* (2006.01)

(52) U.S. Cl. ............................ 716/51; 716/126; 716/130

(58) Field of Classification Search .................. 716/126, 716/129, 130, 51
See application file for complete search history.

(56) References Cited

U.S. PATENT DOCUMENTS

| | | | |
|---|---|---|---|
| 5,843,799 A * | 12/1998 | Hsu et al. ........................... | 438/6 |
| 7,308,669 B2 * | 12/2007 | Buehler et al. .................. | 716/112 |
| 2006/0265684 A1 * | 11/2006 | Buehler et al. .................. | 716/12 |

* cited by examiner

*Primary Examiner* — Nghia Doan
*Assistant Examiner* — Mohammed Alam
(74) *Attorney, Agent, or Firm* — Finnegan, Henderson, Farabow, Garrett & Dunner, LLP (57) ABSTRACT

A method and apparatus for manufacturing an integrated circuit (IC), the method including, generating, by a graphical construction unit, a first graph corresponding to a first net of the IC, the first graph representing a pin of the first net as a vertex, and a connection between two pins of the first net as an edge, the first graph further corresponding to a first IC layout; identifying a first and a second pair of unconnected vertices in the first graph for inserting a first and a second redundant edge, respectively, the first redundant edge and the second redundant edge forming a first connected loop and a second connected loop, respectively, each loop further including at least two edges of the first graph; calculating a tolerance ratio for the first redundant edge and the second redundant edge; sorting the first and second redundant edge based on their tolerance ratio; calculating a yield rate change of the first IC layout associated with inserting one of the first or second redundant edge with a highest tolerance ratio, and updating the first IC layout to include the redundant edge with the highest tolerance ratio if the yield rate change is greater than zero; and calculating the yield rate change of the first IC layout associated with inserting the first or second redundant edge having a second highest tolerance ratio, and updating the first IC layout to include the redundant edge with the second highest tolerance ratio if the yield rate change is greater than zero.

12 Claims, 9 Drawing Sheets

METHOD FOR IMPROVING YIELD RATE USING REDUNDANT WIRE INSERTION

RELATED APPLICATIONS

This application claims the benefit of priority of U.S. Provisional Application No. 61/256,422, filed Oct. 30, 2009, and titled "Method For Improving Yield Rate Using Redundant Wire Insertion" the contents of which are herein incorporated by reference in its entirety.

TECHNICAL FIELD

The present disclosure relates to semiconductors and integrated circuit systems and, more specifically, to systems and methods for improving yield rate in very large scale integrated (VLSI) circuits.

BACKGROUND

As the physical dimensions of very large scale integrated circuits (VLSI) continue to shrink, it has become increasing difficultly to manufacture such integrated circuits reliably. In current complex chip designs, fully functional interconnections between wires and pins associated with various components such as, for example, diodes, capacitors, resistors transistors, etc. are essential in order to ensure reliable operation of a chip.

As VLSI technology migrates towards the 90 nanometer range and below, the sensitivity of a VLSI design to random defects such as opens and/or shorts, increases as the number of components or features being placed on a chip increases and spacing between components decreases. Furthermore, as current manufacturing techniques evolve to keep pace with the shrinking chip sizes, these techniques have become even more sensitive to chip yield rate, which is generally defined as a percentage of fully functional dies relative to a total number of dies on a wafer. In addition, opens and shorts of interconnections can have a great impact on the yield rate.

Current approaches to improve yield rate have focused primarily on mitigating the effects due to open defects or faults. Moreover, some of the techniques currently being implemented to mitigate the effects of open faults, can inadvertently increase the occurrence of short faults, and can thereby further decrease chip yield.

Therefore, there is a need for more efficient methods and systems that can consider the effects of both open and short defects to improve chip yield rate.

SUMMARY

Consistent with some embodiments of the present disclosure, a method for manufacturing an integrated circuit (IC) capable of tolerating random manufacturing defects may includes generating a first graph corresponding to a first net of the IC, the first graph representing a pin as a vertex, and a connection between two pins as an edge. The method may also include identifying a first and a second pair of unconnected vertices in the first graph for inserting a first and a second redundant edge, respectively. The first redundant edge and the second redundant edge further forming a first connected path and a second connected path, respectively, wherein each path further includes at least two edges of the first graph.

The method may also include, calculating a tolerance ratio for the first redundant edge and the second redundant edge and sorting the first and second redundant edges based on their tolerance ratio. The method may also include calculating a yield rate change of the first IC layout associated with inserting one of the first or second redundant edge with a highest tolerance ratio, and updating the first IC layout to include the redundant edge with the highest tolerance ratio if the yield rate change is greater than or equal to zero. The method may further include calculating the yield rate change of the first IC layout associated with inserting the first or second redundant edge having a second highest tolerance ratio, and updating the first IC layout to include the redundant edge with the second highest tolerance ratio if the yield rate change is greater than or equal to zero.

In another embodiment, a method for selecting a set of redundant connections for insertion in an IC may include, generating a graph corresponding to arrangements of pins and connections of the IC, wherein the graph may represent a pin of the IC as a vertex, and a connection between two pins as an edge. The method may also include, identifying a first and a second pair of unconnected vertices in the graph for inserting a first and a second redundant edge, respectively. The first redundant edge and the second redundant edge further forming a first connected path and a second connected path, respectively, wherein each path may further include at least two edges of the graph. The method may also include identifying a different first pair of vertices if the second connected path includes all of the at least two edges of the first connected path, or a different second pair of vertices if the first connected path includes all of the at least two edges of the second connected path. The method may further include selecting as the set of redundant connections, the connections corresponding to the first and second redundant edges of each graph.

In another embodiment, a system for manufacturing an integrated circuit (IC) capable of tolerating random manufacturing defects may include a graphical construction unit (GCU) configured for generating a graph corresponding to an IC net. The graph further representing a pin of the IC as a vertex, and a connection between two pins as an edge. The system may also include a redundant wire generation unit (RWGU) coupled to the GCU and configured for identifying from a generated graph, a first and a second pair of unconnected vertices. The RWGU further configured to insert in the graph, a first and a second redundant edge between the first and second unconnected vertices, respectively. The first redundant edge and the second redundant edge forming a first connected path and a second connected path, respectively, wherein each path further includes at least two edges of the graph.

The system may also include a router unit (RU) coupled to the RWGU, and configured for finding a feasible path associated with the first and the second redundant edge. The system may also include a yield computation unit (YCU) coupled to the RWGU, and configured for calculating and sorting the first and second redundant edge based on their tolerance ratio. The YCU may be further configured for calculating a yield rate change associated with the first and the second redundant edge. The system may further include a redundant wire insertion unit (RWIU) coupled to the YCU, and configured for implementing redundant connections in the IC based on the calculations of the YCU.

Additional features and advantages of the disclosure will be set forth in part in the description which follows. The features and advantages of the disclosed embodiments will be realized and attained by the elements and combinations particularly pointed out in the appended claims.

BRIEF DESCRIPTION OF THE DRAWINGS

The accompanying drawings, which are incorporated in and constitute a part of this specification, illustrate embodiments disclosed herein, together with the description, serve to explain the principles of the disclosed embodiments.

DETAILED DESCRIPTION

In the following description and claims, the terms "coupled" and "connected," along with their derivatives, may be used. It should be understood that these terms are not intended as synonyms for each other. Rather, in particular embodiments, "connected" and/or "coupled" may be used to indicate that two or more elements are in direct physical or electronic contact with each other. However, "coupled" may also mean that two or more elements are not in direct contact with each other, but yet still cooperate, communicate, and/or interact with each other.

Generally, in a VLSI circuit, open and/or short faults between wire interconnections can be caused mainly due to manufacturing defects and electromigration defects. Manufacturing defects can be caused due to random defects and process variations. One source of random defects may be undesired particles falling on the wafer and causing wire interruptions (opens) or shorts. Similarly, process variations can distort wire shapes and result in faults. Electromigration defects can be caused due to the diffusion of metal atoms in a wire along the direction of electron flow. With higher operating signal frequencies and narrower wire widths, current densities are increased and hence are more likely to cause wire open faults due to severe electromigration effects. Typically, a chip is considered "good" if there are no wiring defects such as opens and/or shorts. Therefore, as discussed earlier, in order to increase chip yield, the effects due to opens and shorts must both be mitigated.

Typically, a multi-layered approach can be used to manufacture various integrated circuits (IC). In a multi-layered approach, output and input terminals or pins corresponding to various circuit elements (such as, for example, diodes, capacitors, resistors transistors, etc.) of an IC can form a lower layer, while wire connections between various pins can be etched on one or more upper metallic layers. Furthermore, the one or more upper wiring layers can be stacked upon the lower pin layer to complete the IC.

Figure 1A:
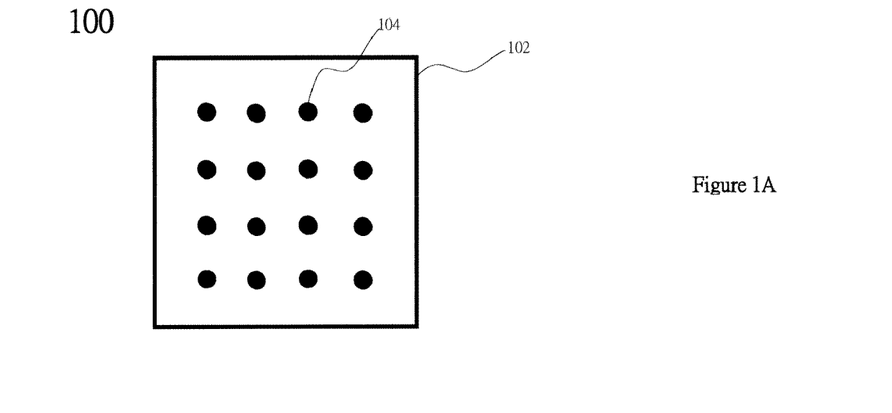
FIGS. 1A-1C illustrate exemplary schematics of a multi-layer integrated circuit (IC) consistent with disclosed embodiments.

FIG. 1A is a schematic illustrating a lower layer 102 of an exemplary IC 100 consistent with some embodiments. As shown in FIG. 1A, layer 102 can include a plurality of pins such as exemplary pin 104. As discussed above, the pins of layer 102 can correspond to output and input terminals of various circuit elements (not shown in FIG. 1A) that can be included in IC 100.

Figure 1B:
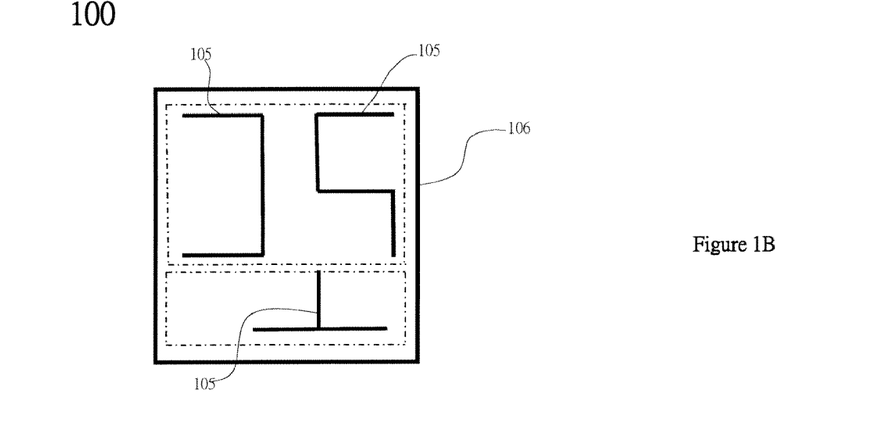

As further discussed above, connections between the various pins of an IC can be completed by stacking one or more wiring layers over a pin layer such as lower layer 102. FIG. 1B is a schematic illustrating an exemplary wiring layer 106 that can complete the pin connections of exemplary IC 100. As shown in FIG. 1B, layer 106 can include wire segments 105 that can be etched in patterns in a manner such that desired connections between the various pins of IC 100 can be made.

Figure 1C:
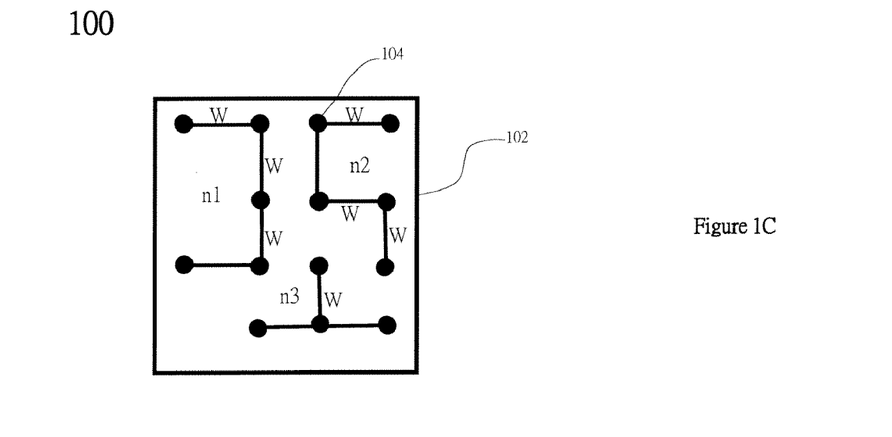

FIG. 1C is a schematic illustrating a top-level view of circuit 100 that can be formed stacking wire layer 106 on top of pin layer 102. As is shown in FIG. 1C, connections between the various pins can take place by wire segments w. In some embodiments, one or more pins connected to each other can be defined as a net. For example, as shown in FIG. 1C, circuit 100 can include nets $n_1$, $n_2$, and $n_3$. For convenience, FIG. 1C illustrates circuit 100 as including three nets (nets $n_1$, $n_2$, and $n_3$). However, it should be understood that in practice an IC can include any number of pins, and nets. Therefore, the present disclosure is not limited in the number of, pins and/or nets that can be included in and/or supported by a system consistent with the present disclosure.

Figure 2A:
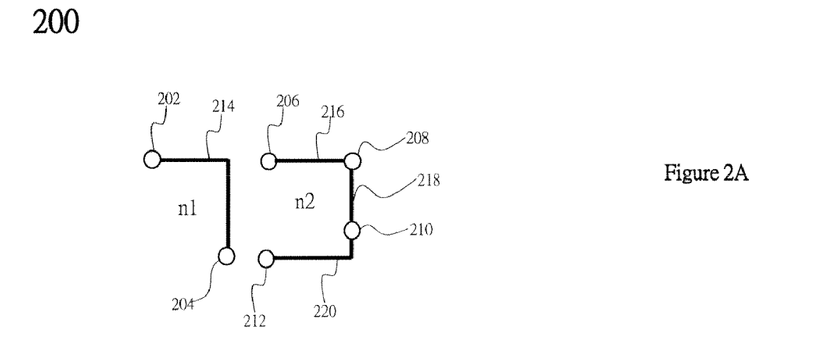
FIGS. 2A-2C illustrate exemplary graphical models for representing an IC consistent with disclosed embodiments.

In some embodiments, graph theory can be used to generate a mathematical representation or graph of a given circuit. FIG. 2A illustrates an exemplary graph 200 of a circuit consistent with some embodiments of the present disclosure. For example, graph 200 can correspond to a circuit that is similar to circuit 100 discussed with respect to FIGS. 1A-1C.

In some embodiments, an IC layout can be modeled as a graph in which vertices can represent the various pins, and edges can represent relationships between the various vertices or pins. For example, if two pins in a circuit are connected by a wire segment, an edge can be drawn between the two corresponding vertices in the graph, illustrating a connection between two pins in a circuit layout.

In the following description and claims, the term "graph" can be used to refer to an "IC," "IC layout," or "net," and vice versa. It should be understood that referring to a vertex of a graph can be equivalent to referring to a pin on the IC corresponding to the vertex, and vice versa. Similarly, referring to an edge of a graph can be equivalent to referring the connection between the two corresponding pins on the IC. Furthermore, the term "connection" or "connections" may be collectively used to refer to a wire or wires connecting two pins, or an edge or edges connecting two vertices.

As is shown in FIG. 2A, exemplary graph 200 depicts nets $n_1$ and $n_2$ that can include vertices 202, 204, 206, 208, 210, and 212 that can correspond to pins of a circuit. Furthermore, the interconnections shared between the various pins of the circuit can be represented by corresponding edges 214, 216, 218, and 220 as shown in FIG. 2A. For example, edge 216 can represent the interconnection between vertex 206 and vertex 208, and edge 220 can represent the interconnection between vertex 212 and vertex 210 etc.

As discussed earlier, to improve reliability and increase yield, the effects of open and/or short faults needs to be mitigated. A net is considered to be "open" if there is a physical disconnect between wire segments connecting two pins. Similarly, a net is considered to be "short" if there is an undesired connection between wire segments of one or more neighboring nets. In some embodiments, the effects of open faults can be minimized by reinforcing the interconnection between various pins of a given net by inserting one or more additional, or redundant, wires. Therefore, the effect of an open fault between wire segments connecting the two or more pins of a net can be mitigated because of the presence of redundant wire connections between the pins. For example, if two pins of a net are connected by two wires (e.g., an original wire and a redundant wire), an open fault in any one of the two wires will not affect the operation of the net because of the presence of the other wire.

Figure 2B:
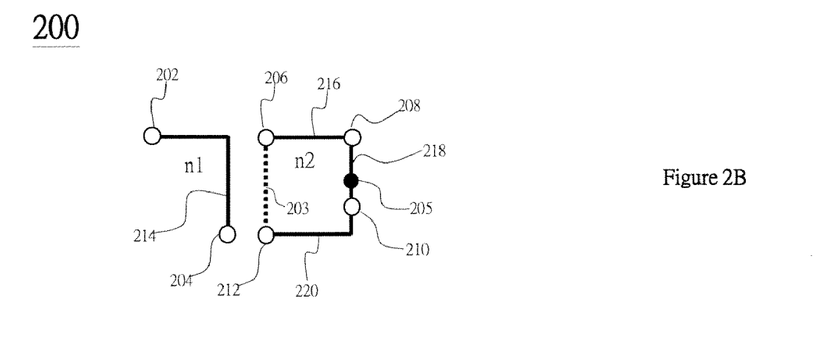

FIG. 2B illustrates exemplary graph 200 that can include an exemplary open fault 205. As can be seen in FIG. 2B, vertices 206 and 212 of net $n_2$ are coupled to one another via edges 216, 218, and 220. However, the presence of an open fault, such as open 205 on one or more interconnects such as for example, on edge 218, can affect the operation of net $n_2$. Therefore, as shown in FIG. 2B, in some embodiments, a redundant wire represented by edge 203 in graph 200 can be inserted to mitigate the effect of an open fault such as open 205 in net $n_2$. For convenience, FIG. 2B illustrates graph 200 as including one open fault such as open 205 on one edge such as edge 280. However, it should be understood that in practice there can be any number of open faults that can be located on any number of wire segments. Therefore, the present disclosure is not limited in the number or location of the open fault(s) that can be included in and/or supported by a system consistent with the present disclosure.

Furthermore, because open faults can occur due to random manufacturing defects, in some embodiments, an open rate (o) can be defined to estimate the occurrence of open faults per unit length of wire used in a chip (IC). In some embodiments, open rate can be specified as part of a manufacturing specification.

Figure 2C:
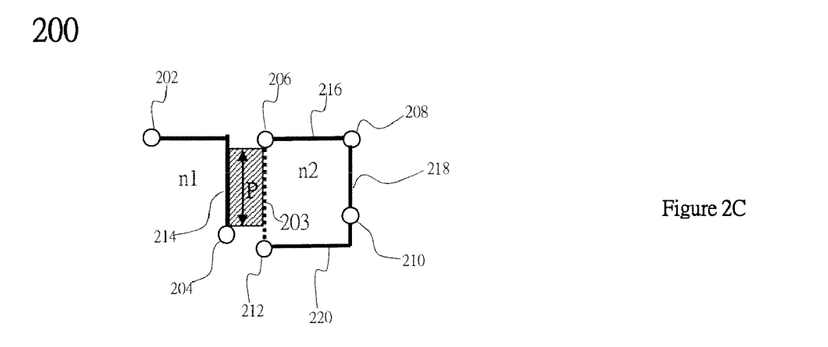

As discussed above, a short can occur when there is an undesired connection between wire segments of one or more neighboring nets that may be in close proximity to one another. As shown in FIG. 2C, insertion of a redundant edge 203 between vertices 206 and 212 to alleviate the effect of open 205, can result in edge 203 being in close proximity to edge 224 of net $n_1$, and can therefore increase the possibility of a short between the wire segments corresponding to edges 203 and 224. Therefore, to maximize overall chip yield and reliability, in some embodiments redundant wires can be inserted into a routed design by considering the effects on both open and short defects.

Figure 3:
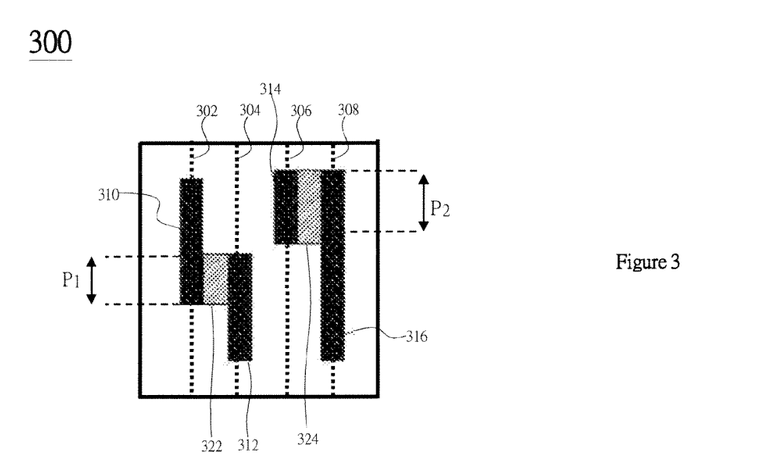
FIG. 3 illustrates a schematic of an exemplary wiring layout consistent with disclosed embodiments.

As was discussed with respect to FIG. 2C, placing wire segments in close proximity to one another can increase the likelihood of one or more short faults. Generally in digital designs, wire segments on layers (such as wire layers 106 and 108 discussed with respect to FIGS. 1B-1C) can be routed on wire tracks to maintain sufficient spacing between adjacent wire segments. FIG. 3 illustrates an exemplary partial wire layout of a circuit 300 consistent with some embodiments of the present disclosure. As shown in FIG. 3, circuit 300 can include wire tracks 302, 304, 306, and 308 that have mounted on them wire segments 310, 312, 314, and 316, respectively. For convenience, FIG. 3 illustrates exemplary circuit 300 as including four wire segments mounted on four wire tracks. However, it should be understood that in practice there can be any number of wire segments that can be mounted on any number of wire tracks. Therefore, the present disclosure is not limited in the number of wire segments and/or wire tracks that can be included in and/or supported by a system consistent with some embodiments.

As further shown in FIG. 3, wires 310 and 312 are in close proximity to one another. In some embodiments, wire 312 can correspond to a redundant wire that may have been inserted to mitigate the effect of an open fault. Because wires 310 and 312 are in close proximity, there can be a likelihood of a short between wires 310 and 312. For example, as shown in FIG. 3, a short defect can occur between neighboring wires 310 and 312 if there is any undesired interconnection between the two wires. Similarly, for the same reasons as discussed with respect to wires 310 and 312, a short defect can occur between neighboring wires 314 and 316. Furthermore, in some embodiments, a short between two wires is more likely to occur along the section of the two wires that are common and parallel to one another. For example, as shown in FIG. 3, a short between wires 310 and 312 can most likely occur in section 322 and a short between wires 314 and 316 can most likely occur in section 324.

In some embodiments, a parallel run length (p) between two wires can be defined as a length of the common parallel portions between the two wires. As shown in FIG. 3, the parallel run length between wires 310 and 312 is depicted as length $p_1$, and the run length between wires 314 and 316 is depicted as length $p_2$. Furthermore, in some embodiments, a total parallel run length (P) can be defined as a sum of all parallel run lengths in a circuit. For example, the total parallel run length P of exemplary circuit 300 can be computed as:

$$P = p1 + p2 \quad (1A)$$

For convenience, FIG. 3 illustrates exemplary circuit 300 as including two parallel run lengths $p_1$ and $p_2$ existing between wires 310 and 312, and wires 314 and 316, respectively. However, it should be understood that in practice there can be any number of parallel run lengths that can exist between on any number of wires. Therefore, the present disclosure is not limited in the number of parallel run lengths and/or wires that can be included in and/or supported by a system consistent with the disclosed embodiments.

As discussed above, a short defect between two or more wires is more likely to occur along their parallel run length. Furthermore, a short defect is more likely to occur between neighboring wires than between non-neighboring wires. Because short faults can occur due to random manufacturing defects, in some embodiments, a short rate per unit parallel run length (s) can be defined as a rate of a short defect occurring per unit parallel run length. Additionally, a total short rate (S) for a given circuit (chip) can be computed as:

$$\text{Total chip short rate} = (\text{short rate per parallel run length}) \times (\text{total parallel run length}) \text{ i.e } S = s \cdot P \quad (1B)$$

In some embodiments, short rate per unit parallel run length s can be specified as part of a manufacturing.

Figure 4A:
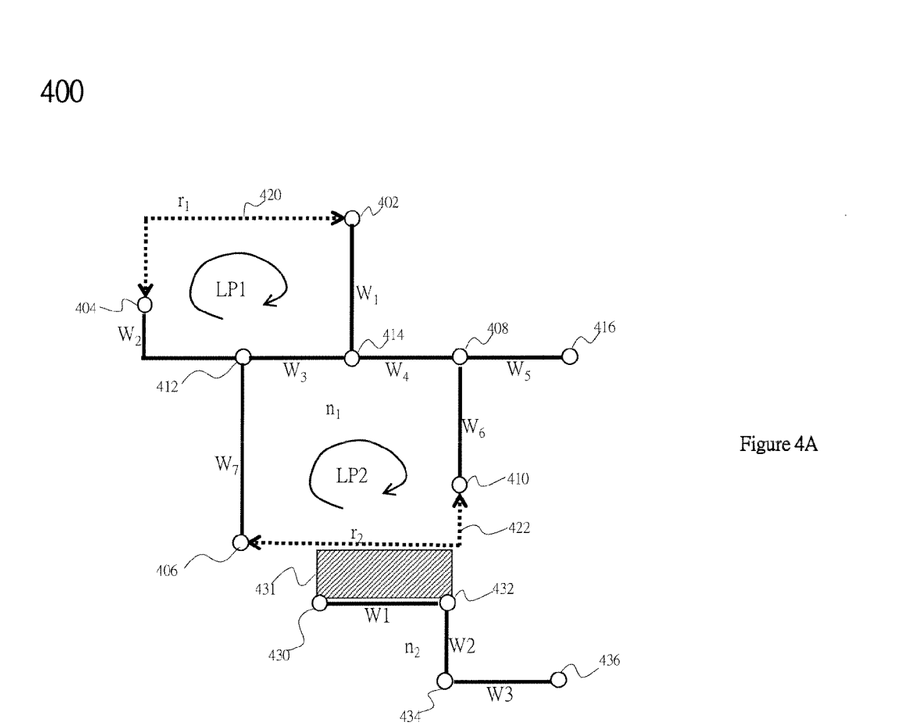
FIGS. 4A and 4B are exemplary graphical representations of an IC depicting a method for improving yield rate consistent with disclosed embodiments.

FIG. 4A illustrates an exemplary graph 400 that can correspond to a circuit consistent with some embodiments of the present disclosure. In a manner similar to that discussed with respect to FIGS. 2A, 2B, and 2C, graph 400 can correspond to one or more nets of a circuit such as exemplary nets $n_1$ and $n_2$. As shown in FIG. 4A, net $n_1$ can include various pins represented by vertices 402, 404, 406, 408, 410, 412, 414, and 416 coupled to each other via various wires represented by edges $W_i$ (i=1, 2, . . . , 7), and net $n_2$ can include pins represented by vertices 430, 432, 434, and 436 coupled to each other via various wires also represented by edges $W_i$ (i=1, 2, 3). As discussed above with respect to FIG. 2B, effects due to potential open faults in a net can be mitigated by inserting redundant wires between one or more pins (termed pin-pin redundant wires) of the net. For example, as shown in FIG. 4A, and in a manner similar to that discussed with respect to FIG. 2B, the effects of potential open fault(s) between vertices 402 and 404 can be mitigated by inserting a pin-pin redundant wire $r_1$ (represented as edge 420) between vertex 402 and vertex 404. Similarly, the effects of potential open fault(s) between vertices 406 and 410 can be mitigated by inserting a pin-pin redundant wire $r_2$ (represented as edge 422) between vertex 406 and vertex 410.

However, in some scenarios, inserting redundant wires can increase the potential of a short occurring between neighboring edges, and can also increase total wire length of a chip (because of the insertion of additional wires), which can in turn decrease chip yield. For example, as shown in FIG. 4A, insertion of redundant edge 422 can increase the likelihood of a short because of a close proximity between redundant edge 422 (of net $n_r$) and edge $W_1$ of net $n_2$. As depicted in FIG. 4A, a short between edge 422 of net $n_1$, and edge $W_1$ of net n2 can most likely occur along short critical area 431. Therefore, in some embodiments, to further improve yield rate, redundant edges can be inserted by considering the effect on both open and short faults.

Consistent with the present disclosure, yield rate (Y) for a given chip can depend on an open rate per unit wire length (o), a short rate per parallel run length (s), a total parallel run length (P), and a total wire length (L). Therefore, in some embodiments, yield rate (Y) of a chip, such as a chip that corresponds to exemplary graph 400, before the insertion of any redundant wires, can be expressed as:

$$Y=(1-o)^L \cdot (1-s)^P \qquad (2)$$

As discussed above, o and s for a given chip can generally be much smaller than 1. Therefore, in some embodiments, equation (2) can be approximated as:

$$Y \cong (1-L \cdot o) \cdot (1-P \cdot s) \qquad (3)$$

Which can be further approximated as:

$$Y \cong 1 - L \cdot o - P \cdot s \qquad (4)$$

As discussed with respect to FIG. 3, wires in a chip can be routed along wire tracks. If T is the total length of all wire tracks in a chip (i.e. total available wire routing resources), then a chip routing density (d) (i.e., probability that a wire is mounted on a given wire track) can be expressed as:

Chip routing density=Total wire length/Total length of routing resource i.e., $d=L/T$ (4A)

Referring back to FIG. 3, each wire track can have at least two neighboring wire tracks (for example wire track 304 can have wire track 302 and wire track 306 as its neighbors on either side). That is, each wire segment on a given wire layer of a chip can have at least two neighboring parallel wire segments. Therefore, the total parallel run length P of a chip before inserting any redundant wires can be expressed as:

P=(Total chip wire length)·(chip routing density) i.e. $P=L \cdot (L/T)$ (4B)

Therefore, from equations 4, 4A, and 4B, yield rate of a chip before redundant wire insertion can be expressed as:

$$Y \cong 1 - L \cdot o - L \cdot (L/T) \cdot s \qquad (5)$$

As can be seen from equations (4B) and (5), yield rate of a chip can decrease with an increase in total chip wire length L and total parallel run length P. Therefore, in some scenarios, inserting individual redundant wires in a chip can increase chip wire length L and consequently decrease chip yield rate Y. However, in some embodiments, yield rate Y can increase by inserting redundant wires that can form a loop between two or more pins of a given net. Because loops can require a minimum of two open faults to fail, the probability of a loop failing can be less likely than the probability of an individual wire failing. Therefore, for a given chip, yield rate can increase by inserting redundant wires that can increase a total length of wires forming loops in a chip. For example, as shown in FIG. 4A, the addition of redundant wires $r_1$ and $r_2$ (represented by edges 420 and 422, respectively) can form loops $LP_1$ and $LP_2$, respectively.

Because insertion of redundant wires in a chip can directly affect yield rate, in some embodiments the yield rate of a chip after redundant wire insertion can be expressed as:

$$Y \cong 1 - (L-C) \cdot o - L \cdot (L/T) \cdot s \qquad (6)$$

Where C is the total length of wire forming loops in a chip. Furthermore, from equation (6), a change in yield rate ($\Delta Y$) from inserting a redundant wire r of length |r|, can be further expressed as:

$$\Delta Y = (C_r - |r|) \cdot o - [(L+|r|)^2 - L^2]/T \cdot s, \qquad (7)$$

where $C_r$ is the increase in C due to the insertion of wire r. In some embodiments, length of a redundant wire |r| can be a manhattan length (distance) between the vertices connected by the insertion of redundant wire r. It should be understood that in the following description and claims, length |r| can be used interchangeably to refer to the actual length or manhattan length of a redundant wire. For example, |r| can be the manhattan length of a wire that is yet to be inserted, or |r| can be the actual length of a redundant wire when a feasible route has been determined. Because the length of a redundant wire |r| can be much smaller than the total wire length L (i.e. |r|<<<L), the average change in yield rate due to the insertion of a redundant wire r can be further expressed as:

$$\Delta Y \cong (C_r - |r|) \cdot o - 2 \cdot |r| \cdot (L/T) \cdot s \qquad (8)$$

Furthermore, the average increase in total parallel run length ($\Delta P$) due to the insertion of redundant wire r can be expressed as:

$$\Delta P = 2 \cdot |r| \cdot (L/T) \qquad (8a)$$

Additionally, the average change in yield rate per unit length due to the insertion of a redundant wire r, can be expressed as:

$$\Delta Y/|r| \cong (C_r/|r| - 1) \cdot o - 2 \cdot L/T \cdot s \qquad (9)$$

As can be seen in equation (9), the short rate increase per unit length (2·L/T·s) can remain the same for any inserted redundant wire r. Therefore, from equation (9), the average change in yield rate per unit length can depend directly on the ratio $C_r/|r|$. In some embodiments, ratio $C_r/|r|$ can be defined as a tolerance-ratio (TR) and can be used as an indicator to identify the effect on overall yield rate of a chip due to the insertion of individual redundant wires. For example, redundant wires with higher tolerance ratios can be more likely to increase overall yield rate than redundant wires with lower tolerance ratios.

As discussed above with respect to FIG. 4A, the effects due to open faults in a chip can be mitigated by inserting pin-pin redundant wires. However, as further discussed with respect to equations (6)-(9), insertion of redundant wires can also increase total chip wire length L, total parallel run length P, and can thereby decrease yield rate Y. Furthermore, as discussed with respect to equation (9), yield improvement per unit length of a chip can be increased by inserting redundant wires that can have a higher tolerance ratio. Therefore, in some embodiments, redundant wires can be inserted between one or more pins and wires (termed pin-wire redundant wires) because of higher tolerance ratio's when compared with pin-pin redundant wires. Because pin-wire redundant wires can be direct projections from pins to wires, pin-wire redundant wires can have shorter paths when compared with pin-pin redundant wires which can usually take L-shaped paths. Hence, the length of a pin-wire redundant wire (|r|) can usually be shorter than a pin-pin counterpart. Therefore, the tolerance-ratio (TR) of a pin-wire can usually be larger than the tolerance ratio of a pin-pin redundant wire.

Figure 4B:
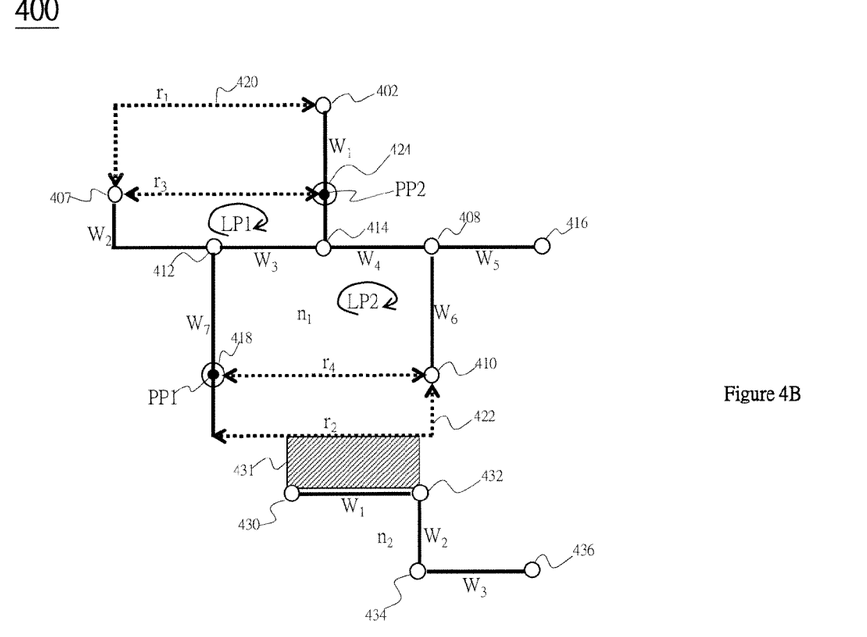

FIG. 4B illustrates exemplary graph 400 that has been modified to include pin-wire redundant wires consistent with some embodiments of the present disclosure. As was discussed with respect to FIG. 4A, insertion of redundant edges 420 and 422 to form loops $LP_1$ and $LP_2$, respectively, can improve chip yield while mitigating the effects of potential open faults along the path of loops $LP_1$ and $LP_2$. However, as can be seen in FIG. 4B, a closer connection point between vertex 410 and vertex 406 of net $n_1$ can lie on edge $W_7$. In some embodiments, one or more projection-points of a vertex in a net can be defined as the closest points on neighboring edges (i.e., wire segments) of the same net that can be to the left, right, top, and/or bottom to the vertex. As shown in FIG. 4B, the projection point of vertex 410 ($PP_1$) can lie on edge $W_7$ and projection point of vertex 404 ($PP_2$) can lie on edge $W_1$. In some embodiments, all projection points corresponding to vertices of a net can be represented as projection vertices. For example, as shown in FIG. 4B, projection points ($PP_1$ and $PP_2$) of net $n_1$ corresponding to vertices 410 and 404 can be represented by projection vertices 418 and 424, respectively.

Therefore, as discussed above, because of higher tolerance ratios of pin-wire redundant wires, yield rate of graph 400 can be improved by inserting pin-wire redundant wires $r_3$ and $r_4$ as shown in FIG. 4B. Furthermore, insertion of pin-wire redundant wires $r_3$ and $r_4$, can reduce total wire length L, thereby further improving chip yield. Additionally, in some embodiments, inserting pin-wire redundant wires can reduce or eliminate one or more short critical areas that could have been created by pin-pin redundant wires, and can thus further improve chip yield and to boost reliability. For example, inserting pin-wire redundant wire $r_4$ as shown in FIG. 4B, can eliminate short critical area 431. In some embodiments, in order to further improve chip yield, a projection-graph can be created by modifying a graph corresponding to a circuit to include projection points. In some embodiments, a projection-graph can depict projection points of a net as additional vertices. A method for generating a projection graph consistent with some embodiments is discussed in detail with respect to FIG. 7A.

As discussed earlier, while redundant wire insertion can mitigate the effects of open faults, inserting additional redundant wires can also decrease chip yield rate. For example, while inserting redundant wires between each and every pin in a net can dramatically mitigate the effects of open faults, it can also decrease overall chip yield rate. Therefore, in some embodiments, a method for selecting an optimum set of redundant wire candidates can be used, that can mitigate the effects of open faults while improving yield is provided. For convenience, FIGS. 5A-5D illustrate an exemplary graph 500 that demonstrates a method for selecting redundant wire candidates consistent with some embodiments of the present disclosure. However, it should be understood that in practice any method for selecting redundant wire candidates consistent with the present disclosure can be implemented on any circuit. Therefore, the present disclosure is not restricted to a any particular type of circuit, net, and/or graph.

Figure 5A:
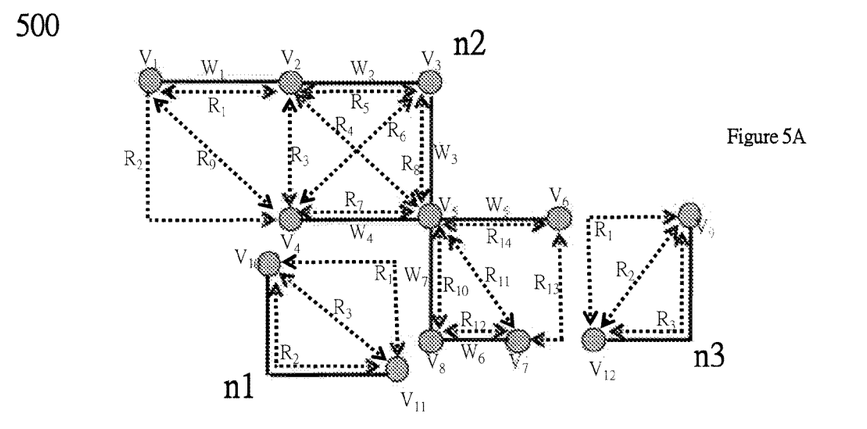
FIGS. 5A-5D are exemplary graphical representations of an IC depicting another method for improving yield rate consistent with disclosed embodiments.

In a manner similar to that discussed with respect to FIGS. 2A, 2B, and 2C, graph 500 can correspond to one or more nets of a circuit. As is shown in FIG. 5A, graph 500 can include nets $n_1$, $n_2$, and $n_3$, where each net is depicted as including corresponding vertices $V_i$ (i=1, 2, 3, . . . , etc.) connected by edges $W_i$ (i=1, 2, 3, . . . etc.). As is further shown in FIG. 5A, each net can include redundant wire candidates $R_i$ (i= 1, 2, 3, . . . , etc.) that can be inserted between each and every vertex of the net. As discussed above, while inserting redundant wires as shown in FIG. 5A can mitigate possible open faults, it can also increase the possibility of short faults, thereby decreasing overall chip yield rate.

Furthermore, as discussed with respect to FIG. 4A, redundant wires that can form closed loops between vertices are more likely to mitigate open faults than individual redundant wires. Therefore, in some embodiments, only redundant wire candidates that can form closed loops between vertices of a net can be selected as candidates for insertion. For example, in some embodiments, only those redundant wires that can form a minimum 2-edge connected graph can be considered as potential redundant wire candidates for insertion. Additional criteria for selecting an optimum set of redundant wires for insertion will be discussed in detail with respect to FIGS. 6 and 7A.

Figure 5B:
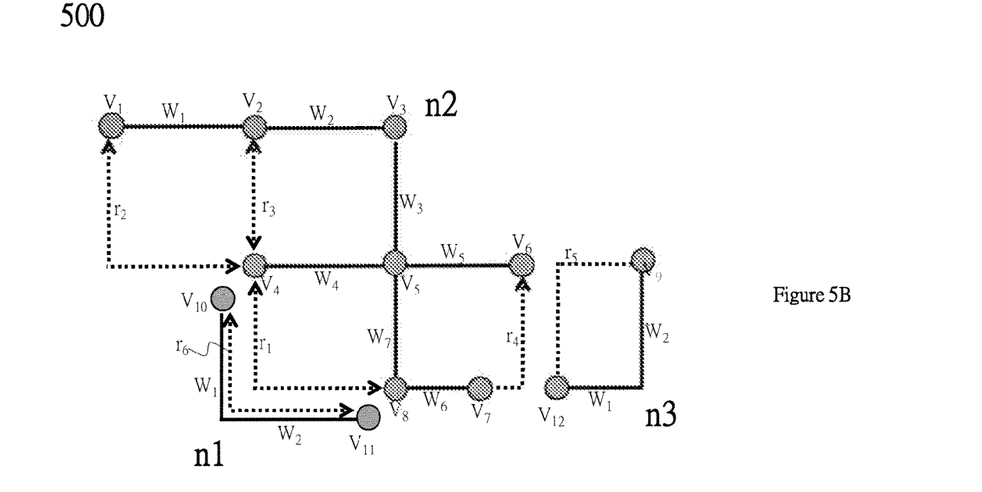

FIG. 5B illustrates graph 500 that has been modified to depict a possible set of redundant wires that can be selected by a method consistent with that discussed with respect to FIG. 5A. As shown in FIG. 5B, possible redundant wire candidates are depicted as redundant wires $r_1$, $r_2$, $r_3$, $r_4$, $r_5$, and $r_6$. Furthermore, each of the possible redundant wires $r_1$, $r_2$, $r_3$, $r_4$, $r_5$, and $r_6$ can form a loop including at least a minimum 2-edge connected graph. For example, redundant wire $r_3$ can form a loop including edges $W_2$, $W_3$, and $W_4$, and redundant wire $r_2$ can form a loop including edges $W_1$, $W_2$, $W_3$, and $W_4$. Furthermore, as will be discussed in detail with respect to FIG. 7A, in some embodiments, if all the edges constituting the loop of a first redundant wire can be included as part of the loop of a second redundant wire, then the first redundant wire may not be considered as a candidate for insertion. For example, as can be seen in FIG. 5B, the connected path including $W_1$, $W_2$, $W_3$, and $W_4$) associated by inserting redundant wire $r_2$, can also include the connected path including $W_2$, $W_3$, and $W_4$) associated with redundant wire $r_3$. Therefore, in some embodiments, redundant wire $r_3$ may not be selected for insertion because the insertion of $r_3$ may not improve overall chip yield rate. Therefore, a possible optimum set of redundant wire candidates for graph 500 can include wires $r_1$, $r_2$, $r_4$, $r_5$, and $r_6$.

Figure 5C:
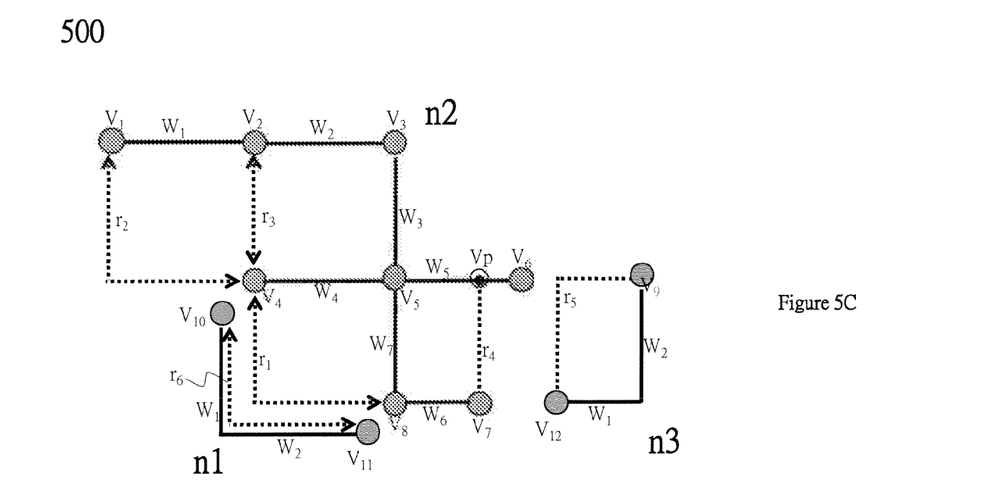

As discussed with respect to FIG. 4B, in some embodiments, a graph can be modified to include all projection points associated with vertices of a net. FIG. 5C depicts graph 500 that has been modified to include all possible projection points. For example, as shown in FIG. 5C, a projection point corresponding to vertex $V_7$ can be represented as vertex $V_p$ on edge $W_5$. Furthermore, in some embodiments, because pin-wire redundant wires can have a higher tolerance ratio, inserting redundant wire $r_4$ between vertices $V_7$ and $V_p$ (as shown in FIG. 5C) can cause a further increase in overall yield rate.

As can be seen from equations (6)-(9), the insertion of each redundant wire can directly affect overall yield rate of a circuit. Also, as was discussed with respect to FIGS. 5A-5B, and as will be discussed further in detail with respect to FIGS. 6 and 7A, a set of possible redundant wire candidates for insertion can change dynamically during the insertion process. Because the overall yield rate can also change with the insertion of each redundant wire, in some embodiments, inserting redundant wire candidates in a particular order can further improve overall chip yield.

Figure 5D:
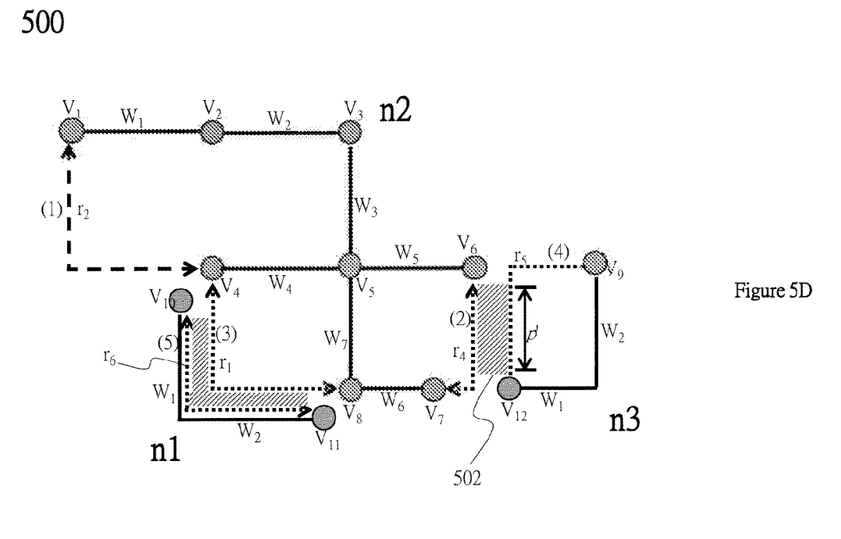

FIG. 5D illustrates graph 500 depicting an exemplary insertion order of redundant wire candidates of FIG. 5B. As was discussed with respect to FIG. 5B, a possible set of redundant wires that can tolerate a maximum number of open faults can include wires $r_1$, $r_2$, $r_4$, $r_5$, and $r_6$. As can be seen from equation (9), tolerance ratio $C_r/|r|$ can be directly proportional to $C_r$ and inversely proportion to redundant wire length.

As was discussed earlier with respect to equation (9), redundant wires with higher tolerance ratios can be more likely to improve yield rate than redundant wires with lower tolerance ratios. For example, in some embodiments, a set of redundant wire candidates can be sorted (and inserted) in decreasing order of their tolerance ratios. Additional criteria for the order of inserting redundant wire candidates will be discussed in detail with respect to FIG. 6.

Figure 6:
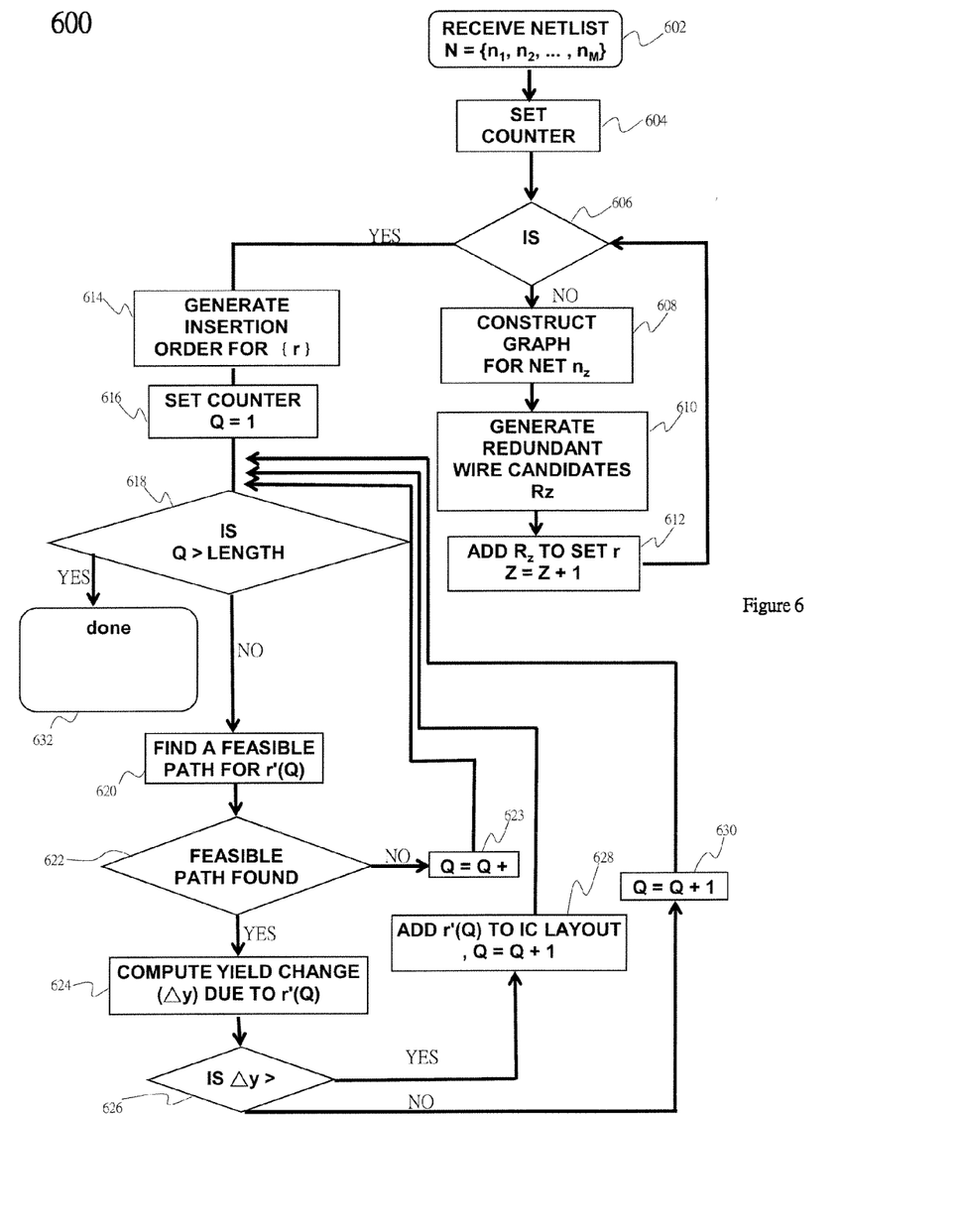
FIGS. 6 and 7A are flow diagrams illustrating a method for improving yield rate consistent with disclosed embodiments.

As was mentioned earlier, a method for sorting candidates for insertion is discussed in detail with respect to FIG. 6. As discussed above and as shown in FIG. 5D, an insertion order for graph 500 consistent with the present disclosure can include $r_4, r_2, r_1, r_5,$ and $r_6$ with $r_4$ being the first to be inserted because $r_4$ has the largest $Cr/|r|$.

FIG. 6 is a flow chart illustrating the steps involved in a method for improving yield rate that is consistent with some embodiments of the present disclosure. As is shown in FIG. 6, the method can start in step 602 by receiving a netlist N corresponding to an IC. In a manner similar to that discussed with respect to FIGS. 1A-1C and 2A-2C, an IC can include one or more nets, where each net can correspond to connections between one or more pins. For example, as shown in FIG. 6, netlist $N=\{n_1, n_2, n_3, \ldots n_M\}$ (M nets) is received in step 602. In steps 604 and step 606, a loop with a counter z can be set up such that, for each net $n_z$ of N, steps 608, 610, and 612 can be repeated.

In step 608, a projection graph corresponding to net $n_z$ can be created. In a manner similar to that discussed with respect to FIG. 4B, and as will be discussed in detail with respect to FIG. 7A, the output of step 608 can be a projection graph that can include additional vertices (projection vertices) corresponding to all projection points of a net. In step 610, the projection graph generated in step 608 can be processed to generate a set of redundant wire candidates for net $n_z$. In some embodiments, the output of step 610 can be a minimum length 2-edge graph including a list of redundant wire candidates that can be similar to the set of candidates discussed with respect to FIGS. 5A-5C. In step 612, the list of redundant wire candidates for $n_z$ generated in step 610 can be added to an initial redundant wire set $r'=\{r'_{1,z}, r'_{2,z}, \ldots, etc.\}$.

After each net of the IC has been processed (i.e. condition (606—Yes) is met), set r' can include a list of redundant wire candidates for all M nets of the IC. In step 614, the redundant wire candidates of set r' can be sorted to generate an insertion order in a manner similar to that discussed with respect to FIG. 5D. In some embodiments, candidates of set r' can be sorted in decreasing order of their tolerance ratio. In some embodiments, the redundant wire candidates of r' can be sorted in an order such that r'(1) can correspond to the redundant wire candidate to be inserted first, r'(2) can correspond to the redundant wire candidate to be inserted second, and so forth.

In steps 616 and 618, a loop with counter (Q) can be set up for traversing each element of r' according to the insertion order generated in step 614. In step 620, a feasible route for inserting a redundant wire r'(Q) of set r' can be found. If no feasible path exists (622—No), then a next redundant wire candidate r'(Q+1) can be processed.

If a feasible path exists (622—yes), then in step 624, a yield rate change (ΔY) associated with r'(Q) can be computed. In some embodiments, ΔY can be computed as:

$$\Delta Y \cong (C_r - |r|) \cdot o - \Delta P' \cdot s \quad (10)$$

Where ΔP' is the parallel run length associated with inserting r'(Q). If a positive change in yield can occur by inserting r'(Q) (step 626—Yes), then in step 628, r'(Q) can be directly added to the IC layout. If inserting r'(Q) does not result in a positive yield change, then in step 630, counter Q can be incremented and the method can return to step 618. If all the elements of r' have been processed (618-Yes), then in step 632, the task is complete.

Figure 7A:
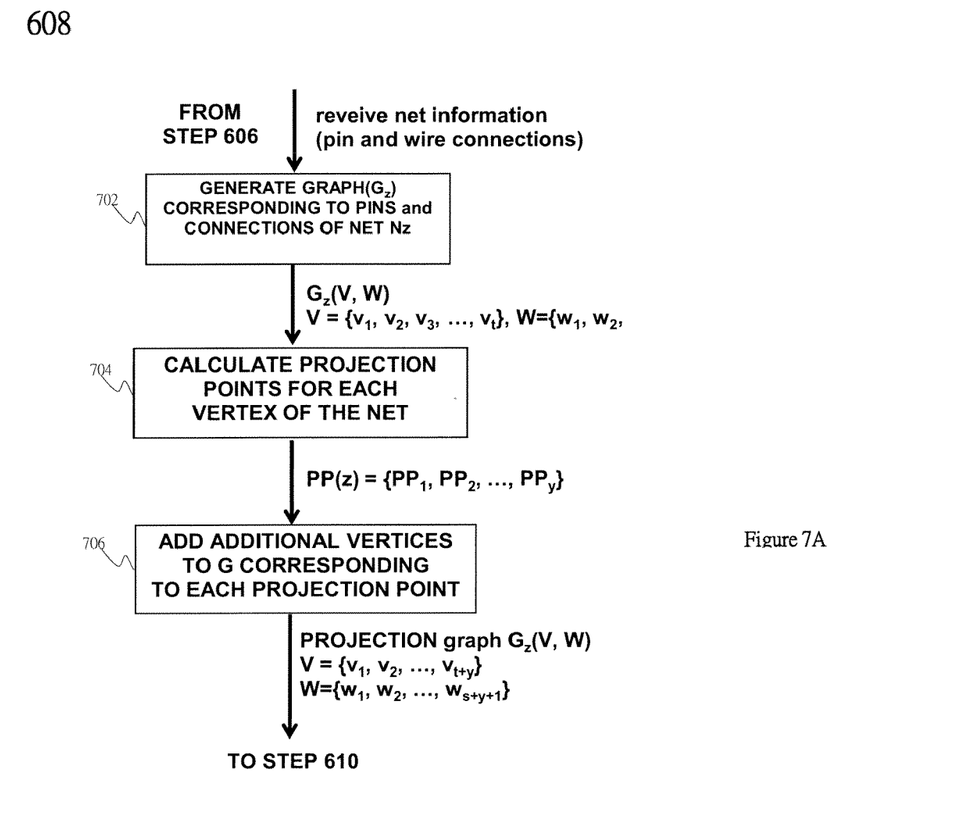

FIG. 7A is a flow chart illustrating a method for generating a graph consistent with step 608 of FIG. 6a. As is shown in FIG. 7A, information pertaining to the pins, and connections between pins of a net such as net $n_z$ (as discussed in FIG. 6) can be received, and in step 702, a graph $G_z$ corresponding to net $n_z$ can be constructed. In some embodiments, as was discussed with respect to FIGS. 2A-2C, graph $G_z$ can be constructed by representing various pins of net $n_z$ as vertices, and representing a connection between two vertices as an edge, In some embodiments, a set $V=\{V_1, V_2, \ldots, V_t\}$ (where t is the total number of pins included in $n_y$), and a set $W=\{W_1, W_2, W_3, \ldots, W_s\}$ (where s is the total number of edges that can be included in $n_z$) can represent the set of vertices and edges, respectively, of a net such as net $n_z$.

As discussed earlier with respect to FIG. 4B, inserting redundant wires between pin and wires (pin-wire redundant wires) can increase overall chip yield. Therefore, in a manner similar to that discussed with respect to FIG. 4B, in step 704, all possible projection points corresponding to each vertex in net $n_z$ can be computed by finding a smallest distance to a neighboring edge. In some embodiments, a set $PP(z)=\{PP_1, PP_2, PP_3, \ldots, PP_y\}$ can represent the set of all projection points of a net $n_z$ (where y is the total number of projection points in $n_z$). Furthermore, in a manner similar to that discussed with respect to FIG. 4B, in step 706, graph $G_z$ can be modified to include additional vertices that can correspond to the projection points calculated in step 704. That is, the set of vertices V can be modified such that $V=\{V_1, V_2, \ldots, V_t, V_{t+1}, V_{t+2}, V_{t+y}\}$, and the set of edges can be modified such that $W=\{W_1, W_2, W_3, \ldots, W_s, W_{s+1}, W_{s+2}, \ldots, W_{s+y+1}\}$. As further shown in FIG. 7A, the out of step 706 can be a projection graph $G_z(V,W)$ of net $n_z$.

Figure 8:
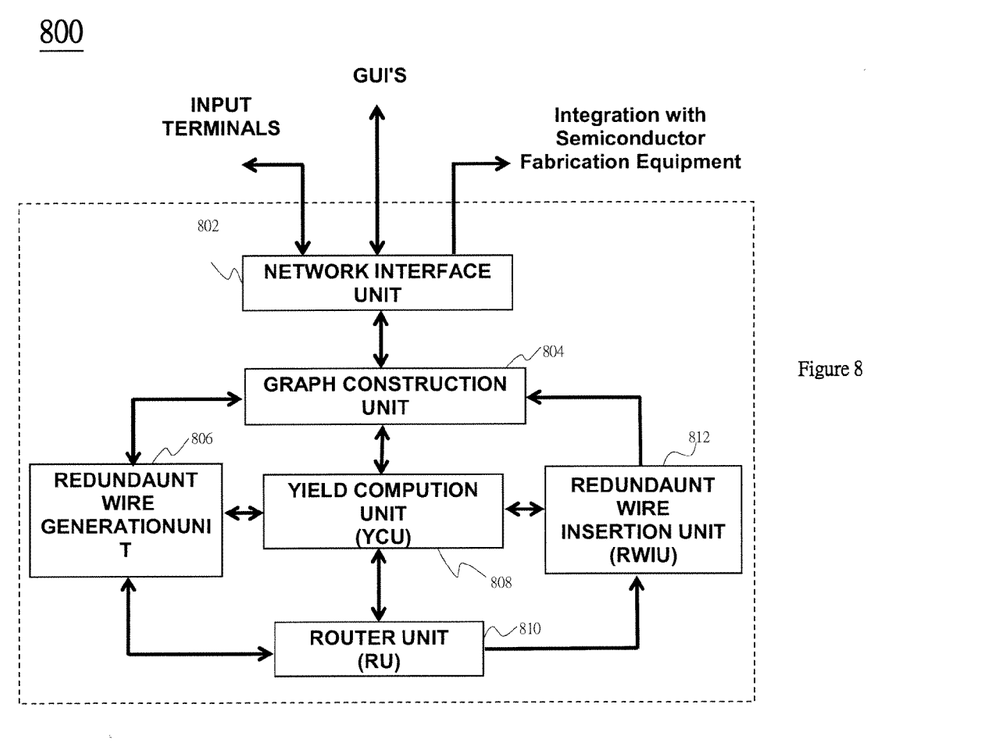
FIG. 8 illustrates an exemplary block diagram of a system for improving yield rate consistent with disclosed embodiments.

FIG. 8 illustrates an exemplary functional block diagram of a integrated circuit (IC) manufacturing system 800 consistent with the disclosed embodiments. As an example, an IC manufacturing system can implement one or more redundant wire insertion techniques consistent with the disclosed embodiments. The various functional units depicted in FIG. 8, individually or in any combination, may be implemented in hardware, in software stored in memory or a computer-readable medium executed by one or more hardware components (such as one or more processors, one or more application specific integrated circuits (ASICs) or other such components), or in a combination of hardware and software.

As illustrated in FIG. 8, system 800 can include a Network Interface unit (NIU) 802 that can include one or more interfaces (as shown in FIG. 8) for communicating with external systems such as input terminals, graphical user interfaces (GUI's), semiconductor fabrication systems, Optical Proximity Correction (OPC) systems, Pattern Generation (PG) systems, and other such systems. As is further shown in FIG. 8, a graph construction unit (GCU) 804 can be coupled to NIU 802. In some embodiments, GCU 804 can receive via NIU 802 one or more design netlists that can correspond to a IC to be manufactured or designed. In a manner similar to that discussed with respect to FIGS. 2A-2C, 6, and 7A, GCU 804 can be configured to construct from one or more received netlists, one or more graphs (and/or projection graphs) corresponding to one or more IC layouts.

As is further shown in FIG. 8, system 800 can include a redundant wire generation unit (RWGU) 806 that can be coupled to GCU 804 and a yield computation unit (YCU) 808. In some embodiments, RWGU 806 can receive one or more graphs from GCU 804, and in a manner similar to that discussed with respect to FIGS. 5A-5B, 6 and 7A, RWGU 806 can be configured to generate a set of redundant wire candidates corresponding to the one or more received graphs. Furthermore, in some embodiments, YCU 808 can be configured to compute overall chip yield and yield change rates associated with various redundant wires generated by RWGU 806. In some embodiments, YCU 808 can be configured to perform various yield rate computations by implementing equations (6)-(9) discussed with respect to FIG. 4A. Furthermore, in a manner similar to that discussed with respect to FIGS. 5A-5B, 6 and 7A, RWGU 806 can use YCU 808 to further optimize a set of redundant wire candidates. In some embodiments, RWGU 806 can also use YCU 808 to generate an efficient insertion order of redundant wire candidates that can improve overall chip yield.

In some embodiments, system 800 can include a router unit (RU) 810 that can be configured to find one or more feasible and efficient paths for routing redundant wire candidates generated by RWGU 806. System 800 can also include a redundant wire insertion unit (RWIU) 812 that can be coupled to various semiconductor fabrication equipments via NIU 802 as shown in FIG. 8. In some embodiments, RWIU 108 can be configured to insert the various redundant wire candidates or designs generated by system 800 by communicating and/or controlling various semiconductor fabrication equipment.

Other embodiments will be apparent to those skilled in the art based on the disclosed embodiments. Various modifications may be made to the systems or methods in the disclosed embodiments. The specification and examples are exemplary only, with a true scope and spirit of the disclosure being indicated by the following claims.

What is claimed is:

1. A method for manufacturing an integrated circuit (IC) capable of tolerating random manufacturing defects, the method comprising:
   generating, by a graphical construction unit, a first graph corresponding to a first net of the IC, the first graph representing a pin of the first net as a vertex, and a connection between two pins of the first net as an edge, the first graph further corresponding to a first IC layout;
   identifying a first and a second pair of unconnected vertices in the first graph for inserting a first and a second redundant edge, respectively, the first redundant edge and the second redundant edge forming a first connected loop and a second connected loop, respectively, each connected loop further including at least two edges of the first graph;
   calculating a tolerance ratio for the first redundant edge and the second redundant edge;
   sorting the first and second redundant edge based on their tolerance ratio;
   calculating a yield rate change of the first IC layout associated with inserting one of the first or second redundant edge with a highest tolerance ratio, and updating the first IC layout to include the redundant edge with the highest tolerance ratio if it is feasible and if the yield rate change is greater than zero; and
   calculating the yield rate change of the first IC layout associated with inserting the first or second redundant edge having a second highest tolerance ratio, and updating the first IC layout to include the redundant edge with the second highest tolerance ratio if it is feasible and if the yield rate change is greater than zero.

2. The method of claim 1, wherein generating the first graph further comprises:
   calculating at least one projection point corresponding to a first vertex of the first net, the at least one projection point being calculated as a shortest distance from the first vertex to at least one neighboring edge; and
   generating a first projection graph by modifying the first graph to include an additional vertex corresponding to the at least one projection point.

3. The method of claim 1, wherein identifying the first and second pair of vertices further comprises:
   identifying a different first pair of vertices if the second connected loop includes all of the at least two edges of the first connected loop, or a different second pair of vertices if the first connected loop includes all of the at least two edges of the second connected loop.

4. The method of claim 1, wherein calculating the tolerance ratio comprises calculating the tolerance ratio of a redundant edge as $$\frac{C_r}{|r|},$$

wherein |r| is a Manhattan length of the redundant edge, and $C_r$ is the total wire length of the connected and closed path formed by the redundant edge including the Manhattan length of the redundant edge.

5. The method of claim 1, wherein calculating the yield rate change comprises calculating the yield rate change associated with a redundant edge as $\Delta Y \cong (C_r - |r|) \cdot o - \Delta P' \cdot s$, wherein $\Delta Y$ is the yield rate change associated with the redundant edge, |r| is a length of the feasible path corresponding to the redundant edge, $C_r$ is an increase in length of a feasible path corresponding to a connected path formed by the redundant edge, o is an open rate per unit wire length associated with the IC, $\Delta P'$ is a change in parallel run length associated with inserting the redundant edge, and s is a short rate per unit parallel run length of wire in the IC.

6. The method of claim 1, wherein selecting at least a first and second redundant edge in the first projection graph comprises selecting a plurality of first and second redundant edges.

7. A method for selecting a set of redundant connections for insertion in an integrated circuit (IC), the set of redundant wires capable of tolerating open faults in the IC, the method comprising:
   generating, by a graphical construction unit, at least one graph, each graph corresponding to arrangements of pins and connections of a net in the IC, the graph representing a pin of the net as a vertex, and a connection between two pins as an edge;
   identifying a first and a second pair of unconnected vertices in a graph for inserting a first and a second redundant edge, respectively, the first redundant edge and the second redundant edge forming a first connected loop and a second connected loop, respectively, each loop further including at least two edges of the graph;
   identifying a different first pair of vertices if the second loop includes all of the at least two edges of the first loop, or a different second pair of vertices if the first loop includes all of the at least two edges of the second loop; and
   selecting as the set of redundant connections, the connections corresponding to the first and second redundant edges of each graph;
   calculating a tolerance ratio for the first redundant edge and the second redundant edge;
   sorting the first and second redundant edge based on their tolerance ratio;

calculating a yield rate change of the first IC layout associated with inserting one of the first or second redundant edge with a highest tolerance ratio, and updating the first IC layout to include the redundant edge with the highest tolerance ratio if it is feasible and if the yield rate change is greater than zero; and calculating the yield rate change of the first IC layout associated with inserting the first or second redundant edge having a second highest tolerance ratio, and updating the first IC layout to include the redundant edge with the second highest tolerance ratio if it is feasible and if the yield rate change is greater than zero.

8. The method of claim 7, wherein generating a graph comprises:

calculating at least one projection point corresponding to a first vertex of a net in the graph, the at least one projection point being calculated as a shortest distance from the first vertex to at least one neighboring edge in the net; and generating a projection graph by modifying the graph to include an additional vertex corresponding to the at least one projection point.

9. A system for manufacturing an integrated circuit (IC) capable of tolerating random manufacturing defects, the system comprising:

a graphical construction unit (GCU), the GCU configured for generating a graph corresponding to a net of an IC, the graph representing a pin of the net as a vertex, and a connection between two pins as an edge;

a redundant wire generation unit (RWGU) coupled to the GCU, the RWGU configured for identifying from a generated graph, a first and a second pair of unconnected vertices in the graph for inserting a first and a second redundant edge, respectively, the first redundant edge and the second redundant edge forming a first connected loop and a second connected loop, respectively, each loop further including at least two edges of the graph;

a router unit (RU) coupled to the RWGU, the RU configured for finding a feasible path associated with the first and the second redundant edge;

a yield computation unit (YCU) coupled to the RWGU, the YCU configured for calculating and sorting the first and second redundant edge based on their tolerance ratio, the YCU further configured for calculating a yield rate change associated with the first and the second redundant edge; and a redundant wire insertion unit (RWIU) coupled to the YCU, the RWIU configured for implementing redundant connections in the IC based on the calculations of the YCU.

10. The system of claim 9, wherein the GCU is further configured to:

calculate at least one projection point corresponding to each vertex of the graph as a shortest distance from the vertex to at least one neighboring edge; and generate a projection graph by modifying the graph to include an additional vertex corresponding to the at least one projection point.

11. The system of claim 9, wherein calculating the tolerance ratio comprises calculating the tolerance ratio of a redundant edge as $$\frac{C_r}{|r|},$$

wherein $|r|$ is a Manhattan length of the redundant edge, and $C_r$ is the total wire length of the connected and closed path formed by the redundant edge including the Manhattan length of the redundant edge.

12. The system of claim 9, wherein calculating the yield rate change comprises calculating the yield rate change associated with a redundant edge as $\Delta Y \cong (C_r - |r|) \cdot o - \Delta P' \cdot s$, wherein $\Delta Y$ is the yield rate change associated with the redundant edge, $|r|$ is a length of the feasible path corresponding to the redundant edge, $C_r$ is an increase in length of a feasible path corresponding to a connected path formed by the redundant edge, o is an open rate per unit wire length associated with the IC, $\Delta P'$ is a change in parallel run length associated with inserting the redundant edge, and s is a short rate per unit parallel run length of wire in the IC.

* * * * *